United States Patent [19]
Roess et al.

[11] 3,761,159
[45] Sept. 25, 1973

[54] OPTICAL MEMORY FOR COHERENT OPTICAL SYSTEMS

[75] Inventors: Dieter Roess, Planegg; Horst Kiemle, Munich, both of Germany

[73] Assignee: Siemens Aktiengesellschaft, Berlin and Munich, Germany

[22] Filed: June 30, 1971

[21] Appl. No.: 158,440

[30] Foreign Application Priority Data
July 14, 1970 Germany............... P 20 34 904.6

[52] U.S. Cl............. 350/160 R, 313/7, 340/173 LT, 340/173 LS, 340/173 CR, 340/173 LM
[51] Int. Cl.............................................. G02f 1/16
[58] Field of Search............... 350/160 R, 160 P; 313/7; 340/173 LT, 173 LS, 173 CR, 173 LM; 331/94.5 M, 94.5 P, 94.5 C

[56] References Cited
UNITED STATES PATENTS

| | | |
|---|---|---|
| 2,281,637 | 5/1942 | Sukumlyn ...................... 350/160 R |
| 2,418,779 | 4/1947 | Leverenz ....................... 350/160 R |
| 3,030,505 | 4/1962 | Bishop et al. .................... 313/7 |
| 3,176,906 | 4/1965 | Redhead ........................ 313/7 |
| 3,296,594 | 1/1967 | Van Heerden ............... 340/173 LT |
| 3,365,543 | 1/1968 | Doi et al. ..................... 340/173 LT |
| 3,500,237 | 3/1970 | Myers et al. ................. 331/94.5 C |
| 3,623,027 | 11/1971 | Williams ..................... 340/173 LT |
| 3,626,320 | 12/1971 | Garwin et al. ............... 331/94.5 M |
| 3,639,854 | 2/1972 | Baldwin ....................... 350/160 P |
| 3,379,998 | 4/1968 | Soules et al. ................ 331/94.5 M |

*Primary Examiner*—Ronald L. Wibert
*Attorney*—Curt M. Avery et al.

[57] ABSTRACT

An optical memory for coherent optical systems comprises a storage medium having transmission properties which may be changed locally by scanning with an electron beam. The storage medium is, for an incident coherent beam of light, a reversible material which may be changed locally in transparency and optical thickness as a function of the direction and energy density of the electron beam.

5 Claims, 4 Drawing Figures

OPTICAL MEMORY FOR COHERENT OPTICAL SYSTEMS

DESCRIPTION OF THE INVENTION

The invention relates to an optical memory for coherent optical systems. More particularly, the invention relates to an optical memory for coherent optical systems comprising apparatus with a controllable electron beam and a storage medium having transmission properties which may be changed locally by scanning with the electron beam.

An optical memory of this type is known, as described in an article in the "IEEE Journal of Quantum Electronics", July, 1966, pages 182 to 184. There it is used in a laser as a controllable spatial filter. The laser makes use of a so-called "concentro-conjugate" resonator. Such a resonator is highly degenerate with respect to its transverse modes and is designed so that each mode represents a diffraction-limited point on the mirror of the resonator. The optical memory constituting the filter, which is locally controllable as to its transmission, permits the excitation of the stimulated radiation in a desired mode in the resonator. This is accomplished by the utilization by the controllable filter of an electro-optical plate which is arranged in front of one of the two resonator mirrors and is locally charged by the electron beam in a birefringent manner. In order to be able to use the locally birefringently charged electro-optical plate for spatial control of the stimulated radiation of the laser, a polarizer is additionally required in the resonator. Moreover, the response sensitivity of the electro-optical plate is very low. Long relaxation times can generally not be avoided.

An object of the invention is to provide for an optical memory for coherent optical systems additional solutions which permit a simpler design and, among other things, attain a higher response sensitivity.

Another object of the invention is to provide an optical memory for a coherent optical system which is of simple structure, has a higher response sensitivity and operates with efficiency, effectiveness and reliability.

In accordance with the invention, an optical memory for coherent optical systems comprises apparatus with a controllable electron beam and a storage medium having transmission properties which may be changed locally by scanning with the electron beam. According to our invention, the storage medium is, for an incident coherent beam of light, a reversible material which can be changed locally in transparency and/or optical thickness as a function of the direction and the energy density of the electron beam.

The invention is based on the knowledge that optical memories for coherent optical systems can be realized in a simple manner by providing as the storage medium a reversible material which can be changed in transparency and/or optical thickness. Such materials are known and exhibit a relatively high response sensitivity.

In a first, preferred embodiment, the storage medium of the invention comprises a reversible photographic material, preferably photochromic glass. The incident coherent beam of light passes through the photochromic glass practically without attenuation up to the point of impact of the electron beam. The local change in the transparency caused at the point of impact of the electron beam by blackening may be used for the purpose of optical information storage, for example, in optical data processing.

In a second preferred embodiment, the storage medium comprises a color-center forming crystal, for example, an alkali halogenide.

In a third preferred embodiment, the storage medium comprises a thermoplastic material, the optical thickness of which is influenced, for example by the controlled electron beam. The function involves a so-called phase memory, that is, a memory which represents the stored information by the locally different phase of the passing coherent light.

In a fourth preferred embodiment of the invention, a semiconductor material in the form of a film is used as the storage medium. With suitable dimensions, thin semiconductor layers have strong light-absorbing properties. This absorption can be cancelled through saturation in specific spectral ranges by electron bombardment and can therefore make the semiconductor layer locally transparent. Mixed semiconductors are suitable as semiconductor material, particularly a mixture of gallium, arsenic and phosphorus ($GaAs_{(1-x)}P_x$) having a layer thickness of preferably 0.3 to 3 micrometers.

Particularly favorable conditions are obtained if the storage medium which may be applied to a carrier plate, is arranged together with the electron beam generator in a vacuum-tight vessel, preferably a glass envelope, which has at least one window to admit the coherent beam of light falling on the storage medium. To prevent the detrimental effect of degassing on the trouble-free operation of the apparatus it is logical to connect the vacuum-tight vessel to an ion getter pump. It is advisable to provide at least one lock in the vessel to permit the replacement of the storage medium, if necessary.

Depending upon the choice of the storage medium used, an auxiliary source of radiation for erasing the information stored in the storage medium must be provided. At times, it may also be of advantage to utilize an auxiliary radiation source for sensitizing the storage medium.

If the storage medium, which is variable in transparency, is applied to a carrier which constitutes a mirror, an optical memory in the form of a mirror may thus be realized which may be controlled in reflection behavior.

The optical memory of the invention may be used to particular advantage as a spatial filter in a laser resonator, preferably in a laser with high degeneration of transverse modes. If, in such an application, a semiconductor layer is used as the storage medium, it is practical to utilize the semiconductor layer so that in the region pumped by the electron beam it is simultaneously the amplifying material of the laser, making use of inversion.

In order that the invention may be readily carried into effect, it will now be described with reference to the accompanying drawings, wherein.

In the FIGS., the same components are identified by the same reference numerals.

Figure 1:
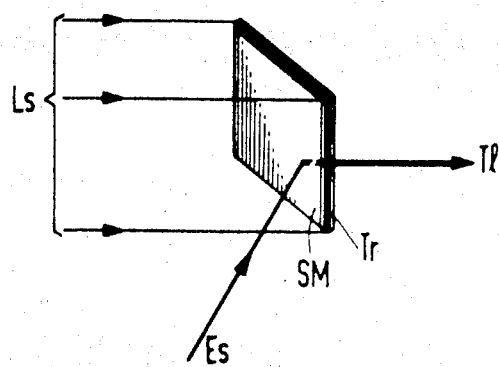
FIG. 1 is a schematic diagram of a first embodiment of the optical memory of the invention.

In the embodiment of FIG. 1, a carrier plate Tr carries a storage medium SM in layer form on its left-hand surface. The storage medium SM is specifically in the form of an absorbing semiconductor layer which has dimensions which are such that it is pumped to saturation in the region of the point of impact of an electron beam Es. The electron beam Es is applied from the lower left and is controlled in direction, and, if desired, in power density. In other words, the storage medium SM, comprising the semiconductor layer, becomes transparent for coherent light Ls coming from the left only in the region of the point of impact of the electron beam Es, as indicated by the partial light beam Tl. The storage medium SM may thus make the layer SM transparent for the passage of a partial beam at any desired point by suitable control of the electron beam over the surface area of the layer.

If a photochromic glass plate is used as the storage medium SM, the coherent light Ls coming from the left goes through said plate, except at the point of impact of the electron beam Es. In the region of the point of impact of the electron beam Es, the plate SM is blackened and its transparency at such point is substantially reduced or cancelled altogether.

If thermoplastic material is used as the storage medium which may be controlled in optical thickness, all the coherent light coming from the left also passes through said thermoplastic material. The thermoplastic material is in the form of a layer or a plate, but the relative phase of the coherent part of the light which passes through the storage medium at the point of impact of the electron beam Es is changed with respect to the remainder of the passing coherent light (phase memory).

Figure 2:
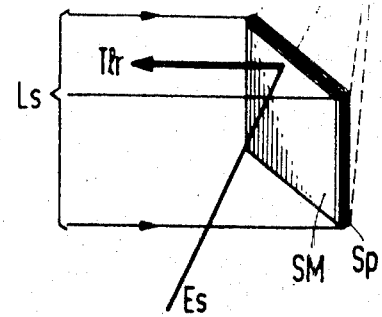
FIG. 2 is a schematic diagram of a second embodiment of the optical memory of the invention.

Similar results are obtained if, as shown in FIG. 2 the storage medium SM is backed by a mirror Sp. If the storage medium SM is in the form of a layer, it may be applied directly to the mirror Sp, which functions as the carrier plate. If the storage medium SM is an absorbing semiconductor layer which is pumped to saturation by the electron beam Es in the region of its impact area, the coherent light Ls, falling on the storage medium from the left, is absorbed, except for the reflected partial beam Tr in the region of the point of impact of said electron beam.

If the storage medium is a plate of photochromic glass which is backed by a mirror, the coherent light Ls, coming from the left, is reflected practically without loss, except for that fraction of the light which penetrates into the photochromic glass plate at the point of impact of the electron beam Es. A similar situation exists with respect to the phase relations of the fractions of reflected light if a thermoplastic material, controllable in optical thickness, is used as the storage medium.

Figure 3:
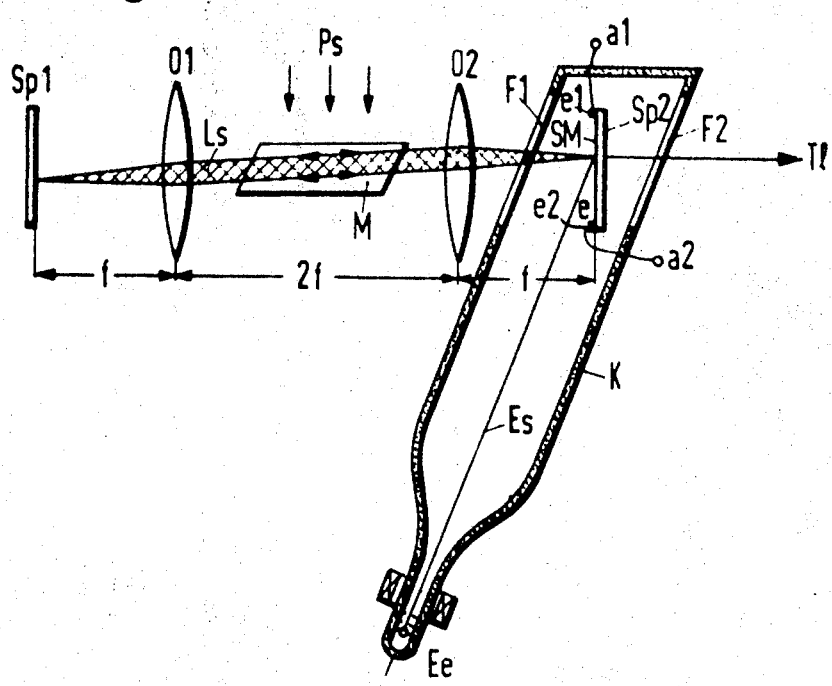
FIG. 3 is a schematic diagram, partly in section, of an embodiment of the optical memory of the invention utilized in a laser.

In the apparatus of FIG. 3, the optical memory of the invention is applied as a transparency-controllable filter in a laser. The laser arrangement utilizes a so-called "concentroconjugate" resonator. This resonator comprises two planar mirrors, which are a mirror Sp1 and a mirror Sp2. The mirror Sp2 carries the storage medium SM in layer form. Two convex lenses 01 and 02 are positioned between the mirrors Sp1 and Sp2. Active material M is positioned between the convex lenses 01 and 02. The active material M is pumped to inversion by a pump light source Ps. In this application, as well as in the third embodiment of the invention, described with reference to FIG. 4, it is assumed that the storage medium SM is a semiconductor layer which can be pumped to saturation by the electron beam Es.

Each of the two convex lenses 01 and 02 is at a distance $f$ from the mirror closest to it. The convex lenses 01 and 02 are spaced a distance $2f$ from each other. The distance $f$ corresponds to the focal length of the convex lenses 01 and 02. Such a resonator is highly degenerate with respect to its transverse modes and also has the property that each mode in which the stimulated radiation occurs occupies a diffraction-limited point on the mirrors Sp1 and Sp2. The semiconductor layer storage medium SM permits the mirror Sp2 to become effective, due to its absorbing properties, only at those points where the electron beam Es pumps said semiconductor layer. Therefore, the coherent radiation of the laser is always excited in that mode which results in such a diffraction-limited point in the region of the point of impact of the electron beam Es on the semiconductor layer SM. The beam path of the stimulated coherent light Ls is indicated in FIG. 3 by a crosshatched area.

As shown in FIG. 3, the optical memory is combined with the electron beam arrangement controlling it to form one assembly in which the mirror Sp2 with the storage medium SM applied to it and an electron gun Ee are mounted in a vacuum-tight vessel K which has windows F1 and F2 in the region of said mirror. The windows F1 and F2 are positioned at the Brewster angle with the axis of the resonator.

In the embodiment of FIG. 3, the mirror Sp2 simultaneously functions as an output coupling. To accomplish this, the mirror Sp2 is made only partially reflecting. The coherent partial beam Tl passes through the mirror Sp2 and the storage medium SM at the point of impact of the electron beam Es, as in FIG. 1. The semiconductor layer comprising the storage medium SM carries at its upper end electrode e1 and at its lower end electrode e2. The lead a1 of the electrode e1 is brought out and the lead a2 of the electrode e2 is brought out. The electrodes e1 and e2 function to provide rapid charge equalization with a view toward a short relaxation time.

As hereinbefore stated, it is desirable that the semiconductor material be selected so that the semiconductor layer is simultaneously the amplifying material of the laser in the region pumped by the electron beam, with inversion.

Figure 4:
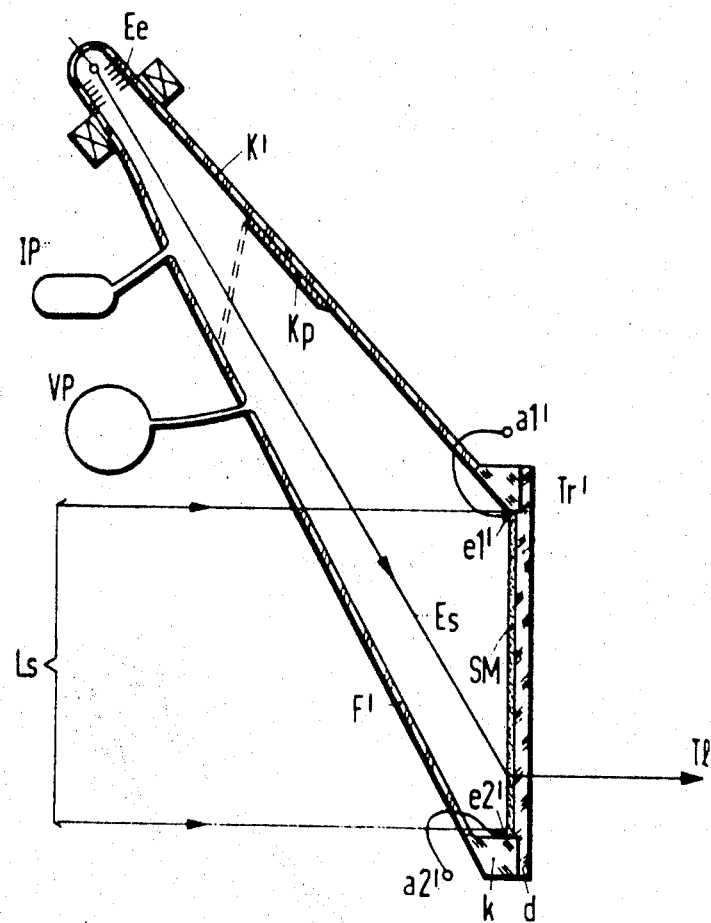
FIG. 4 is a schematic diagram, partly in section, of a third embodiment of the optical memory of the invention.

The embodiment of FIG. 4 comprises an optical memory and electron beam arrangement and permits the replacement of the storage medium SM. The embodiment of FIG. 4 comprises a vacuumtight vessel K' which is shaped in the form of a funnel and accommodates an electron gun Ee at its end having the smaller diameter. At the larger diameter end, the vacuum-tight vessel K' terminates in a flange $k$ and is provided at said end with a cover plate. The cover plate comprises a carrier plate Tr' on which the storage medium SM is applied in layer form.

The carrier plate Tr' is removably connected to the flange $k$ of the vacuum-tight vessel K' by means of screws, not shown in the FIG. A ring gasket d is inserted between the flange $k$ and the carrier plate Tr' and provides the required vacuum-tight seal. The coherent light Ls again falls from the left, through a window F' provided in the vacuum-tight vessel K', onto the storage medium SM, which is pumped to saturation at the point of impact of the electron beam Es and passes at this point through said storage medium and the carrier plate Tr' as the partial beam Tl. The window F' is positioned at the Brewster angle with respect to the axis of the beam of coherent light Ls, similarly to the windows F1 and F2 of FIG. 3.

As shown in FIG. 4, the interior space of the vacuum-tight vessel K' is subdivided by means of a hinged or movably mounted shutter Kp for the purpose of creating a lock. In order to exchange the storage medium SM, the shutter Kp is moved to the position shown by broken lines by means not shown in the FIG. A suitable shutter moving device may comprise, for example, a magnet device. When the shutter Kp is moved to its broken line position, the space containing the electron gun Ee, or the first chamber, is separated by said shutter from the rest of the space, or the second chamber. In this position of the shutter Kp, an ion getter pump IP is connected only to the first chamber and a roughing pump VP is connected only to the second chamber.

The ion getter pump IP maintains the vacuum in the region of the first chamber. The vacuum in the second chamber is broken for the replacement of the storage medium SM and is reestablished by the roughing pump VP after the exchange is completed. Subsequently, the shutter Kp is swung back into its rest position, shown in FIG. 4, and the ion getter pump IP again act on both parts of the vacuum-tight vessel K'.

If the reversible material used is a storage medium which retains the stored information over long periods of time, thereby functioning as a long term memory, an auxiliary source of radiation of suitable design must be provided for erasing the memory, the light of which is fed to the storage medium. Sometimes, the storage medium SM may also be sensitized by means of such an auxiliary source of radiation, in the desired manner. Such an auxiliary source Q is shown in FIG. 2.

The thermoplastic material which may be utilized as the storage medium SM may comprise any suitable easily fusible dielectrics, such as, for example, various polymers. A suitable thermoplastic material may comprise, for example, a natural tree resin known as "Staybelite", manufactured by Hercules, Inc., of Wilmington, Delaware.

While the invention has been described by means of specific examples and in a specific embodiment, we do not wish to be limited thereto, for obvious modifications will occur to those skilled in the art without departing from the spirit and scope of the invention.

We claim:

1. An optical memory for coherent optical systems having apparatus comprising means for producing a controllable electron beam and a storage medium having transmission properties which may be changed locally by scanning with the electron beam said storage medium comprising, for an incident coherent beam of light, a reversible material which may be changed locally in transparency and optical thickness as a function of the direction and energy density of the electron beam; a vacuum-tight vessel having at least one window formed therein for the passage of a coherent beam of light, a carrier plate in the vessel and a source of electrons in the vessel, and wherein the storage medium is mounted on the carrier plate in the vessel in a position in which the coherent beam of light passing through the window impinges upon the storage medium and electrons from the source impinge upon said storage medium; an ion getter pump coupled to the vacuum-tight vessel; and at least one lock formed in the vacuum-tight vessel in the region of the storage medium to permit replacement of the storage medium.

2. An optical memory as claimed in claim 1, wherein the storage medium comprises a crystal forming color centers.

3. An optical memory as claimed in claim 1, wherein the storage medium is a semiconductor material comprising a mixture of gallium, arsenic and phosphorus and has a layer thickness of 0.3 to 3 micrometers.

4. An optical memory as claimed in claim 1, wherein the carrier plate comprises a mirror.

5. An optical memory as claimed in claim 1, wherein the storage medium has a bulk and surface conductivity sufficient to prevent charging thereof and further comprising electrodes on the storage medium for removing a charge therefrom.

* * * * *